United States Patent
Benson et al.

(10) Patent No.: US 8,386,503 B2
(45) Date of Patent: Feb. 26, 2013

(54) METHOD AND APPARATUS FOR ENTITY REMOVAL FROM A CONTENT MANAGEMENT SOLUTION IMPLEMENTING TIME-BASED FLAGGING FOR CERTAINTY IN A RELATIONAL DATABASE ENVIRONMENT

(75) Inventors: Donald Edward Benson, Erie, PA (US); Edward Joseph Gallagher, San Jose, CA (US); Mang-Rong Ho, San Jose, CA (US); Dwayne Lorenzo Richardson, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1479 days.

(21) Appl. No.: 10/758,501

(22) Filed: Jan. 16, 2004

(65) Prior Publication Data

US 2005/0160078 A1    Jul. 21, 2005

(51) Int. Cl.
 G06F 17/30 (2006.01)
(52) U.S. Cl. ...................................... 707/758
(58) Field of Classification Search .................. 707/1, 3, 707/4, 758
See application file for complete search history.

(56) References Cited

U.S. PATENT DOCUMENTS

| | | | | |
|---|---|---|---|---|
| 5,386,559 A * | 1/1995 | Eisenberg et al. | ............ | 707/201 |
| 5,937,406 A * | 8/1999 | Balabine et al. | ............ | 707/100 |
| 5,940,594 A * | 8/1999 | Ali et al. | ........................ | 709/203 |
| 6,564,215 B1 * | 5/2003 | Hsiao et al. | ........................ | 707/8 |
| 2001/0047358 A1 | 11/2001 | Flinn et al. | | |
| 2002/0066033 A1 | 5/2002 | Dobbins et al. | | |
| 2002/0112035 A1 | 8/2002 | Carey et al. | | |
| 2002/0133484 A1 | 9/2002 | Chau et al. | | |
| 2002/0133491 A1 | 9/2002 | Sim et al. | | |
| 2002/0174200 A1 * | 11/2002 | Kozina | ........................ | 709/220 |
| 2003/0069902 A1 * | 4/2003 | Narang et al. | ................ | 707/203 |
| 2003/0198330 A1 * | 10/2003 | Porter | ...................... | 379/220.01 |

OTHER PUBLICATIONS

Plumley, Sue, "Ten Minute Guide to Windows NT Workstation 4.0" Aug. 1996, Que Publishing, pp. 1-3 (cover) and pp. 1-3 (Moving or Copying Files or Folders).*
Microsoft, Mircosoft Windows XP Professional service pack 1 2002.*
Pogue, David, Mac OS X: The Missing Manual Nov. 2002, Pogue Press/O'Reilly Associates, Inc., Second Ed.*
Suparna Bhattacharya et al., "Coordinating Backup/Recovery and Data Consistency Between Database and File Systems," 2002, pp. 500-511.
Edward A. Feustel, "Process Exchange on the PRIME Family of Computers," 1983, pp. 32-43.
IBM Research Disclosure, Article No. 452159, "A Uniform Method for Distribution of Internet Data to Appropriate Servers," Dec. 2001, pp. 2140-2142.
IBM Research Disclosure, Article No. 447171, "Method for Delivering For-Fee Content to a Wireless Handheld Web Browser Device While Guaranteeing Ownership of Proprietary Content," Jul. 2001, pp. 1260-1262.

* cited by examiner

*Primary Examiner* — Etienne Leroux
(74) *Attorney, Agent, or Firm* — Sughrue Mion, PLLC (57) ABSTRACT

The present invention provides a way to efficiently validate and process requests, such as deletion requests, that affect items having associated objects in a content management system. When the request is received, a timestamp for the item is retrieved. A timestamp for any objects affected by the request are then retrieved and checked against the timestamp for the item. The request is then completed on the item and objects based on the respective timestamps for the item and the objects.

19 Claims, 6 Drawing Sheets

| Object ID (308) | Item ID (310) | Timestamp (312) | ... (314) |
|---|---|---|---|
|  |  |  |  |

METHOD AND APPARATUS FOR ENTITY REMOVAL FROM A CONTENT MANAGEMENT SOLUTION IMPLEMENTING TIME-BASED FLAGGING FOR CERTAINTY IN A RELATIONAL DATABASE ENVIRONMENT

FIELD

The present invention relates to managing content for an enterprise. In particular, the present invention relates to managing removal of content for an enterprise.

BACKGROUND

Today, many enterprises store a variety of types of content for its operations. Electronically implemented "libraries" have become a popular way for an enterprise to manage its content. It is common for these content management solutions to maintain and control thousands of different entities, such as files, objects, images, or documents. In addition, these content management solutions may maintain and control multiple versions of this content.

One problem with allowing multiple versions of content is controlling how and when a user updates or deletes one or more versions of that content. For example, a user may prematurely update or delete a valid version of an image stored in a content management system. As another example, a user may inadvertently update an old or deleted version of a document rather than the most current version of that document. These actions may thus cause a content management system to have one or more invalid versions of an entity, or make the content management system unable to locate a proper version of an entity.

Accordingly, it may be desirable to provide methods and apparatus that manage multiple versions of content.

SUMMARY

In accordance with one feature of the invention, a request that affects an item is validated. A version of the item is identified based on a first time. Whether the request affects an object associated with the item is determined. When the request affects an object, a version of the object is identified based on a second time. The request is then completed based on the version of the item and the version of the object.

In accordance with another feature of the invention, requests that delete an item are processed, wherein the items may include associated objects. When a request that deletes an item is received, a first age is identified for the item affected by the request. Information indicating a second age of at least one associated object is then retrieved. The item and the at least one associated object are deleted based on whether the first age of the item is greater than or equal to the second age of the at least one associated object.

Additional features of the invention will be set forth in part in the description which follows, and in part will be obvious from the description, or may be learned by practice of the invention. The features of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE EMBODIMENTS

One feature of the present invention provides a content management system that can handle multiple versions of content. Reference will now be made in detail to exemplary embodiments of the invention, which are illustrated in the accompanying drawings. Wherever possible, the same reference numbers will be used throughout the drawings to refer to the same or like parts.

Figure 1:
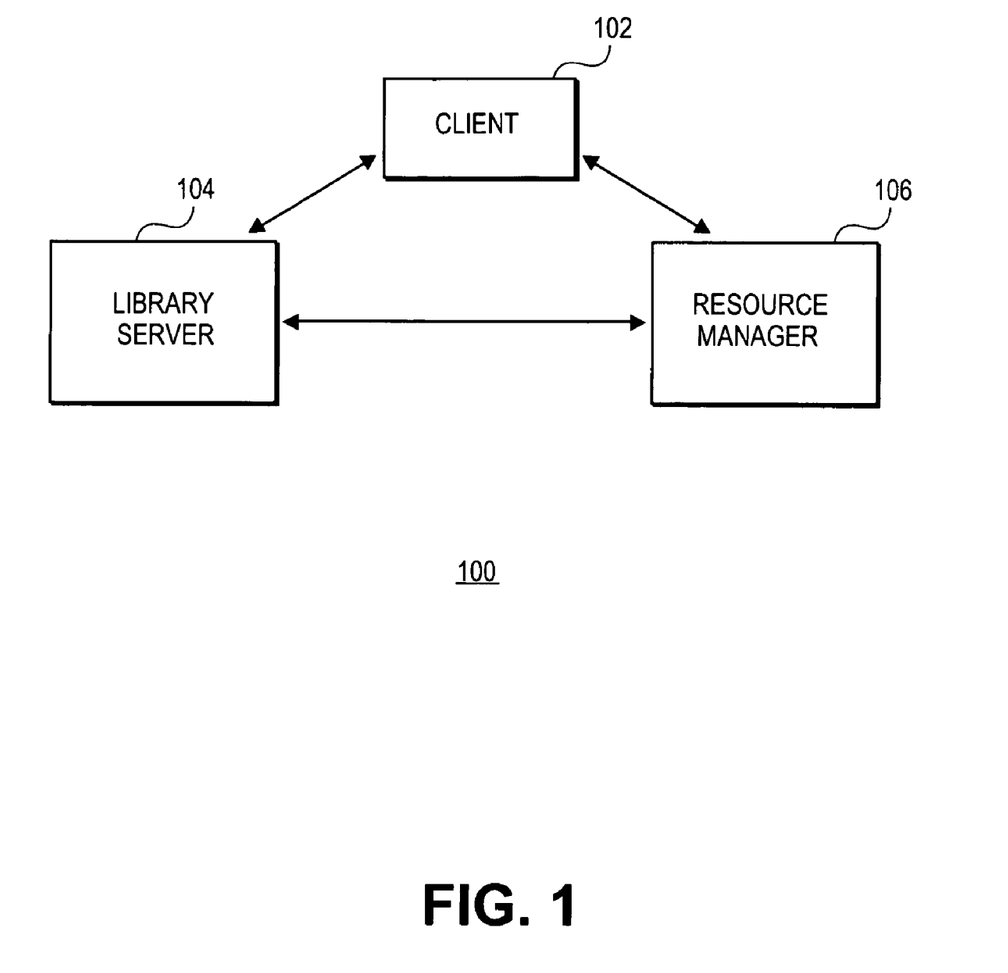
FIG. 1 shows a content management system that is consistent with the principles of the present invention.

FIG. 1 shows a content management system 100 that is consistent with the principles of the present invention. As shown, content management system 100 may comprise a client 102, a library server 104, and a resource manager 106. These components may be coupled together using one or more networks, such as a local area network, or wide area network. In addition, these components may communicate with each other using known protocols, such as the transport control protocol and internet protocol ("TCP/IP") and hypertext transport protocol ("HTTP").

The components of content management system 100 may be implemented on separate devices or may be implemented on one or more of the same devices or systems. For example, library server 102 and resource manager 104 may be installed on the same machine and run under a common operating system. Alternatively, content management system 100 may have one or more of its components implemented on multiple machines that run different operating systems. Some of the specific components of content management system 100 will now be described.

Client 102 provides a user interface for content management system 100. Client 102 may be implemented using a variety of devices and software. For example client 102 may be implemented on a personal computer, workstation, or terminal. In addition, client 102 may run under a Windows® operating system, or through a browser application, such as Internet Explorer™ by Microsoft® Corporation or Netscape Navigator™ by Netscape Communications® Corporation. Although FIG. 1 shows a single client, content management system 100 may include any number of clients.

Library server 104 stores, manages, and provides access control to items stored by content management system 100. Library server 104 processes requests, such as creates, reads, updates, and deletes, from client 102 and maintains the data integrity between the other components of content management system 100, such as resource manager 106. For example, library server 104 may work in conjunction with resource manager 106 to retrieve an object, such as a document or image file, that is referenced by an item.

Library server 104 may be implemented using a variety of devices and software. For example, library server 104 may be a computer that runs one or more application programs and stored procedures under an operating system, such as z/OS®, Windows®, AIX®, or Solaris®. In addition, library server 104 may include a database management system, such as a relational database management system, to manage stored items and perform searches for content management system 100. For example, library server 104 may use the DB2® Universal Database™ by International Business Machines Corporation (IBM®). Library server 104 is also described with reference to FIG. 2.

Resource manager 106 stores objects corresponding to items in content management system 100. Objects may be any data entity for an item that is in digital form. For example, an object may be an audio file, an application, an image, text, or a video file. Resource manager 106 may store the objects in various formats, such as JPEG images, MP3 audio, AVI video, and ASCII text. Resource manager 106 may also store objects in formats, such as Microsoft® Word, Lotus® Word Pro®, and Wordperfect®.

Furthermore, resource manager 106 may also be configured to store multiple copies of objects on the same or a separate resource manager (not shown). Although FIG. 1 shows a single resource manager, content management system 100 may include any number of resource managers. For example, content management system 100 may include multiple resource managers that are distributed across one or more networks.

Resource manager 106 may be implemented using known devices and software. For example, resource manager 106 may be installed on one or more computers that run under the z/OS® operating system, and includes a DB2® Universal Database™, as well as a server to communicate with client 102 and library server 104, such as a HTTP server. In addition, resource manager 106 may include one or more storage devices, such as a magnetic disc drive. Resource manager 106 is also described with reference to FIG. 3.

Figure 2:
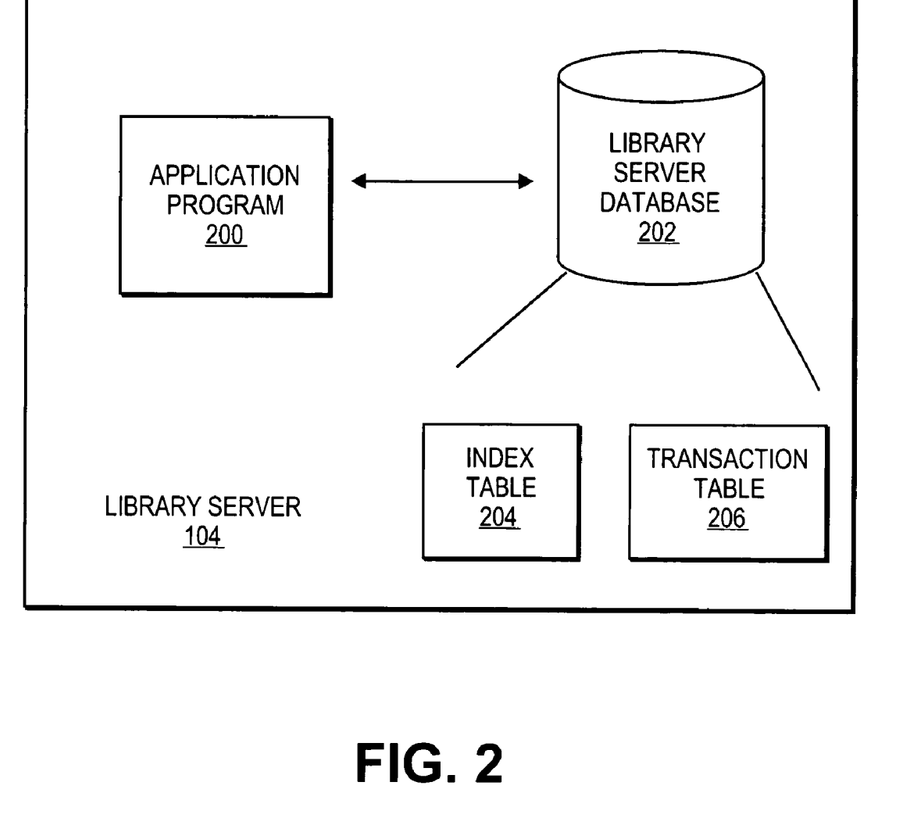
FIG. 2 shows a conceptual diagram of a library server that is consistent with the principles is invention.

FIG. 2 shows a conceptual diagram of library server 104 that is consistent with the principles of the present invention. As shown, library server 104 may comprise an application program 200 and a library server database 202.

Application program 200 is program code that implements the functions and procedures of library server 104, such as communications with client 102 and resource manger 106 and operations with library server database 202. Application program 200 may be written in a variety of host programming languages, such as C, C++, Java, or COBOL. In addition, application program 200 may include a set of embedded modules (not shown) that comprise SQL statements for interacting with library server database 202.

Library server database 202 serves as a catalog for items stored by content management system 100. In order to catalog a variety items, library server database 202 may classify items according to an item identifier. Library server 202 may automatically assign the item identifier when the item is stored or updated. In addition, in order to allow for multiple versions of an item, library server 202 may classify items according to a version and timestamp.

Objects associated with a particular item, such as a document, may also be indexed by library server database 202 and stored by resource manager 106. For example, for an insurance business, library server database 202 may use an item type for insurance claims and policy holders. The item type specifies the format of the information, such as the policy holder name, address, and vehicle information. Each individual claim and policy holder would then be considered an item and indexed by library server database 202. Documents corresponding to each individual claim, such as a fax, may then be stored as objects in resource manager 106. Objects may also have multiple versions.

Library server database 202 may be implemented using a variety of devices and software. For example, library server database 202 may be implemented as a relational database, such as a DB2® Universal Database™. In addition, library server database 202 may use a variety of types of storage, such as tape drive, optical storage units, or magnetic disk drive.

Library server database 202 may use a set of tables, such as an index table 204 and transaction table 206. Index table 204 may contain information that indexes the items stored by content management system 100. For example, index table 204 may index or reference objects stored by resource manager 106 for a particular item. Transaction table 206 may contain information for controlling of transactions to be performed by content management system 100. Transaction table 206 may be useful to ensure that transactions that have been concurrently requested to library server database 202 are properly controlled. For example, transaction table 206 may contain information tracking items that have been deleted (or updated) by one or more users. One example of index table 204 and transaction table 206 is further described with reference to FIG. 2A.

Figure 2A:
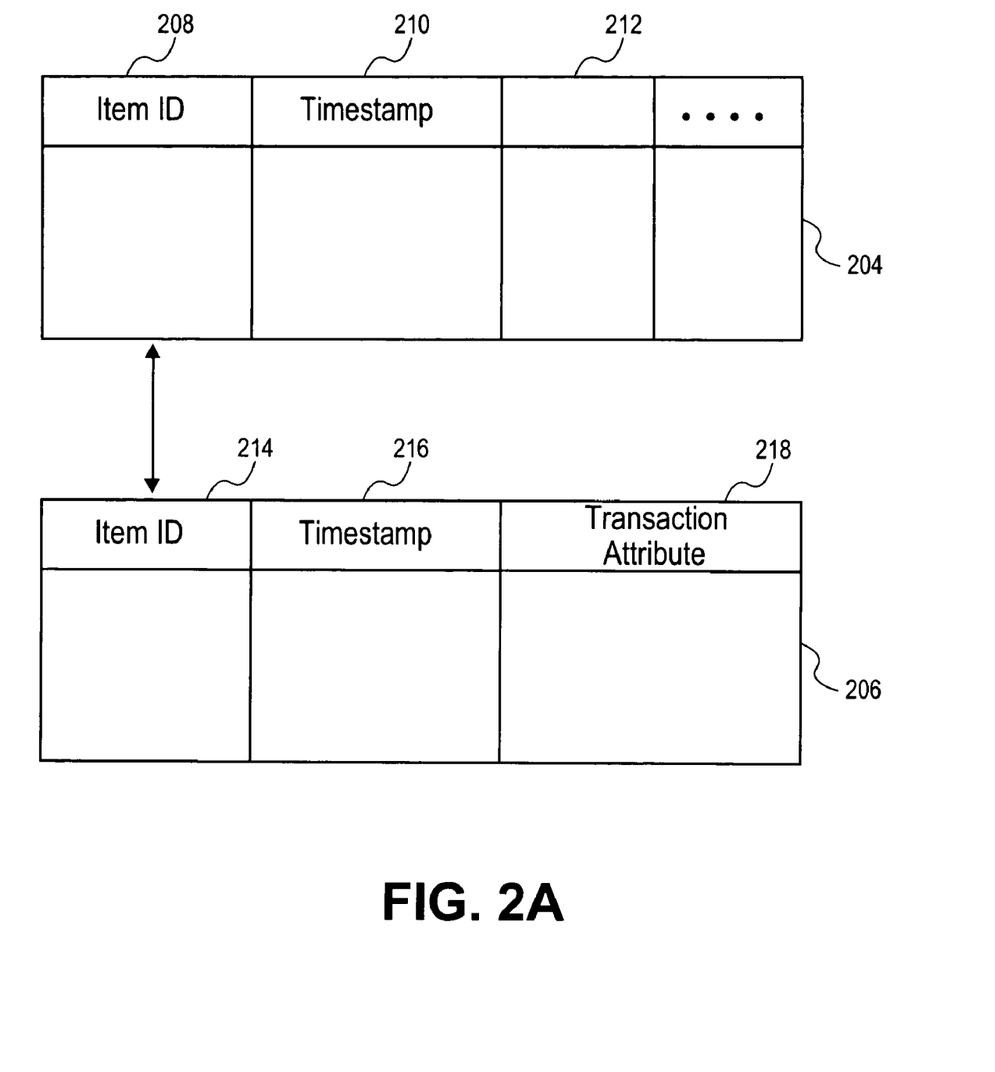
FIG. 2A shows one example of tables that may be used by the library server in accordance with the principles of the present invention.

Referring now to FIG. 2A, examples of index table 204 and transaction table 206 are shown. As noted, index table 204 provides information that indexes the items stored by content management system 100. For example, index table 204 allows library server 104 to locate one or more objects stored in resource manager 106, which correspond to a particular item. As shown, index table 204 may comprise an item identifier column 208, a timestamp column 210, and one or more value columns 212.

Item identifier column 208 includes information that uniquely identifies each item. An item identifier may be a numeric or alphanumeric sequence that is automatically assigned by library server database 202.

Timestamp column 210 includes information that specifies a time for a particular item. The timestamps may be in a variety of formats and use numeric or alphanumeric characters. Library server 104 may assign the timestamps automatically for content management system 100 to ensure that a single time reference is used for all transactions. Library server 104 may assign the timestamps according to any level of accuracy, such as to each millisecond.

Value columns 212 include information that indicates various attributes of an item. Value columns 212 may include information in any format, such as numeric, and alphanumeric characters. The information in value columns 212 may, for example, include information that describes certain characteristics or properties of an item, such as a first name, surname, age, or city. The information in value columns 212 may also be used as key fields. For example, information in value columns 212 may be used to reference or locate objects that are stored in resource manager 106.

In addition, value columns 212 may include information that indicates a version for a particular item. A version may be identified by a numeric or alphanumeric sequence. This version sequence may be automatically assigned by library server database 202 or set by a user.

Transaction table 206 includes information for controlling transactions performed by content management system 100. A transaction may affect only the information in library server database 202, or information in both library server database 202 and content database 302. For example, a transaction may affect metadata associated with an item and corresponding content, such as objects, documents, or images, of an item. As shown, transaction table 206 may comprise an item identifier column 214, a timestamp column 216, and one or more transaction attribute columns 218.

Item identifier column 214 includes information that uniquely identifies each item affected by a particular transaction. As shown, the information in item identifier column 214 may serve as a key to link information in transaction table 206 with information in index table 204. For example, item identifier column 214 may use the same identifiers contained in item identifier column 208 of index table 204. The item identifiers in item identifier column 214 may be in a variety of formats, such as numeric or alpha numeric. Alternatively, the item identifiers in column 214 may be assigned automatically by library server database 202 based on the identifiers used in item identifier column 208 of index table 204.

Timestamp column 216 indicates the timestamp of the particular item that is affected by a transaction. For example, when a delete transaction is requested, library server database 104 may write the item's timestamp from column 210 of index table 204 into timestamp column 216.

Transaction attribute columns 218 provide one or more columns of information indicating the attributes and parameters of a particular transaction. For example attribute columns 218 may include information about the types of access controls enforced for each item stored by content management system 100, isolation levels, references, unique attributes, input parameters, and output parameters of a particular transaction. In addition, transaction attribute columns 218 may include the version identifier of the item affected by the transaction.

Figure 3:
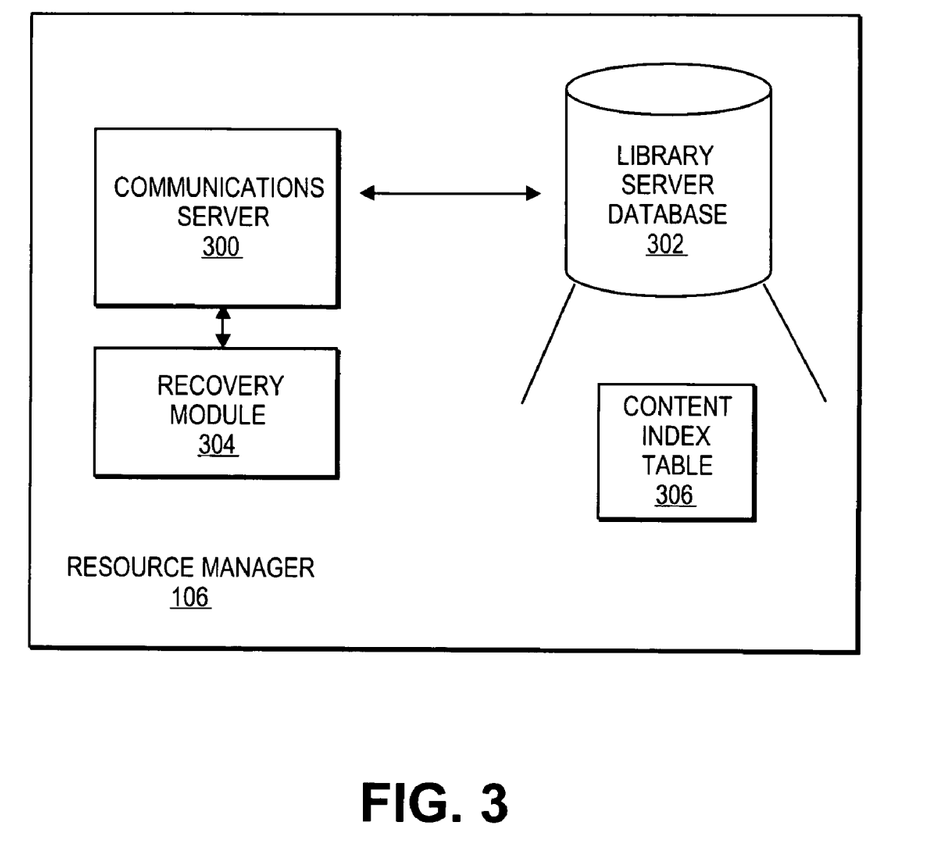
FIG. 3 shows a conceptual diagram of a resource manager that is consistent with the principles of the present invention.

FIG. 3 shows a conceptual diagram of resource manager 106 that is consistent with the principles of the present invention. As shown, resource manager 106 may comprise a communication server 300, a content database 302, and a recovery module 304.

Server 300 provides communication services between resource manager 106, client 102 and library server 104. In one embodiment, communication server 300 is implemented as an HTTP server that is configured to communicate with client 102 and library server 104.

Content database 302 manages and stores objects for content management system 100. Content database 302 may be implemented using a variety of devices and software. For example, in one embodiment content database 302 can be implemented as a relational database, such as DB2® Universal Database™. In addition, content database 302 may use a variety of types of storage, such as can drive optical storage units, or magnetic disk drive.

In addition, content database 302 may include one or more tables, such as a content index table 306. Content index table 306 may contain information that indexes the content corresponding to various items. For example, content index table 306 may index or reference objects, such as documents and image files, stored by resource manager 106. An example of content index table 306 is further described with reference to FIG. 3A.

Recovery module 304 is program code that allows for recovery of transaction errors. For example, recovery module 304 may assist in recovering data that was inadvertently deleted. In addition, when content management system 100 includes multiple resource managers, recovery module 304 may be used to coordinate data recovery in the event of a transaction error. Recovery module 304 may be written in a variety of host programming languages, such as C, C++, Java, or COBOL. Recovery module 304 may be a separate application within resource manager 106, or may be embedded as a component of communications server 300.

Figure 3A:
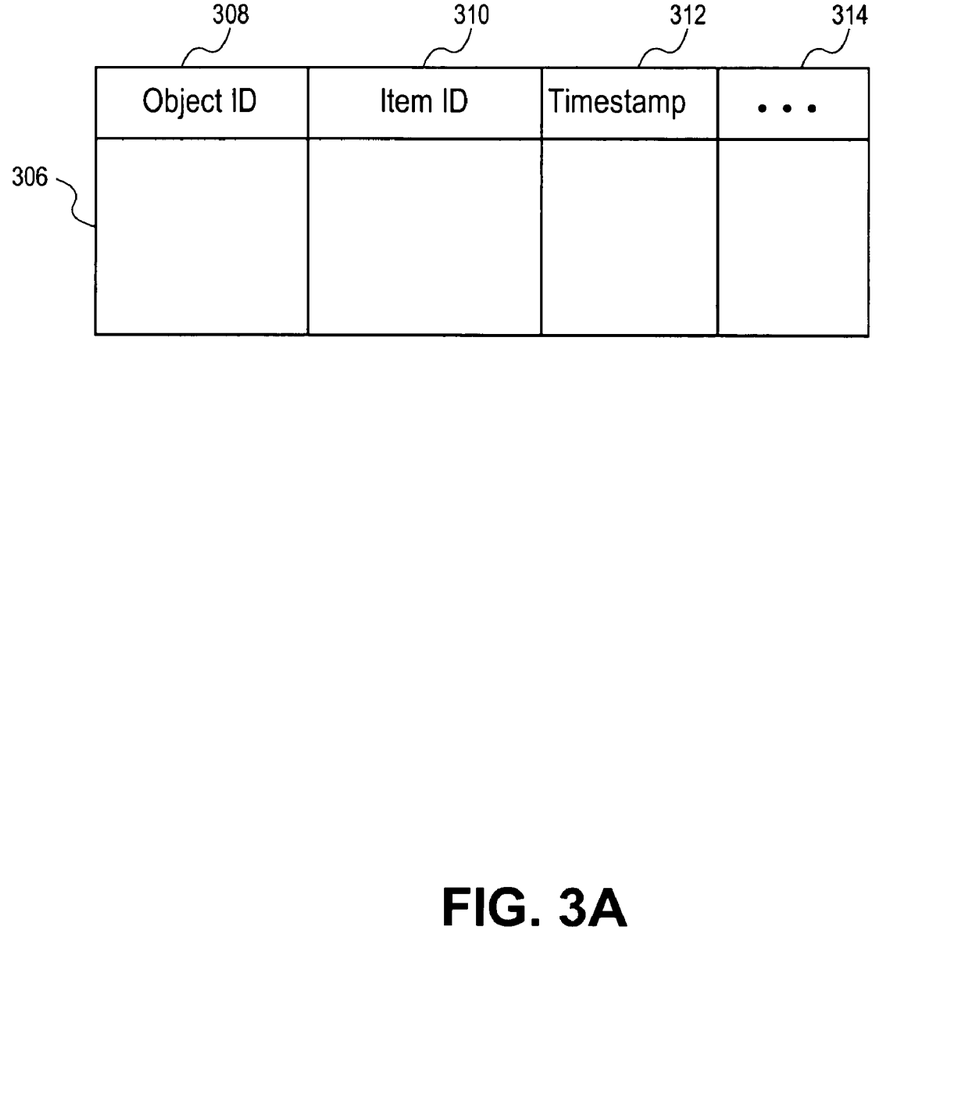
FIG. 3A shows one example of a table that may be used by the resource manager in accordance with the principles of the present invention.

Referring now to FIG. 3A, an example of content index table 304 is shown. As shown, content index table 304 may comprise an object identifier column 308, an item identifier column 310, a timestamp column 312, and one or more value columns 314.

Object identifier column 308 includes information that uniquely identifies each object. An object identifier may be a numeric or alphanumeric sequence that is automatically assigned by library server database 202.

Item identifier column 310 includes information that uniquely identifies each item to which a particular object corresponds. An item identifier may be a numeric or alphanumeric sequence that is automatically assigned by library server database 202. The information in column 310 may correspond to the item identifiers used in index table 204 and transaction table 206, respectively. Accordingly, item identifier column 310 may serve as a key that links the items indexed by library server database 202 with their corresponding objects stored in content database 302.

Timestamp column 312 includes information that specifies a time for a particular object stored in content database 302. The timestamps may be in a variety of formats and use numeric or alphanumeric characters. In one embodiment, library server 104 may assign the timestamps for each object automatically to ensure that a single time reference is used for objects. Library server 104 may assign the timestamps for each object according to any level of accuracy, such as to each millisecond.

Value columns 314 include information that indicates various attributes of each object. Value columns 314 may include information in any format, such as numeric, and alphanumeric characters. The information in value columns 314 may, for example, include information that describes certain characteristics or properties of an object, such as whether the object is text searchable, its location, and data format.

In addition, value columns 314 may include information that indicates a version for a particular object. A version may be identified by a numeric or alphanumeric sequence. This version sequence may be automatically assigned by library server database 202, content database 302, or set by a user.

Figure 4:
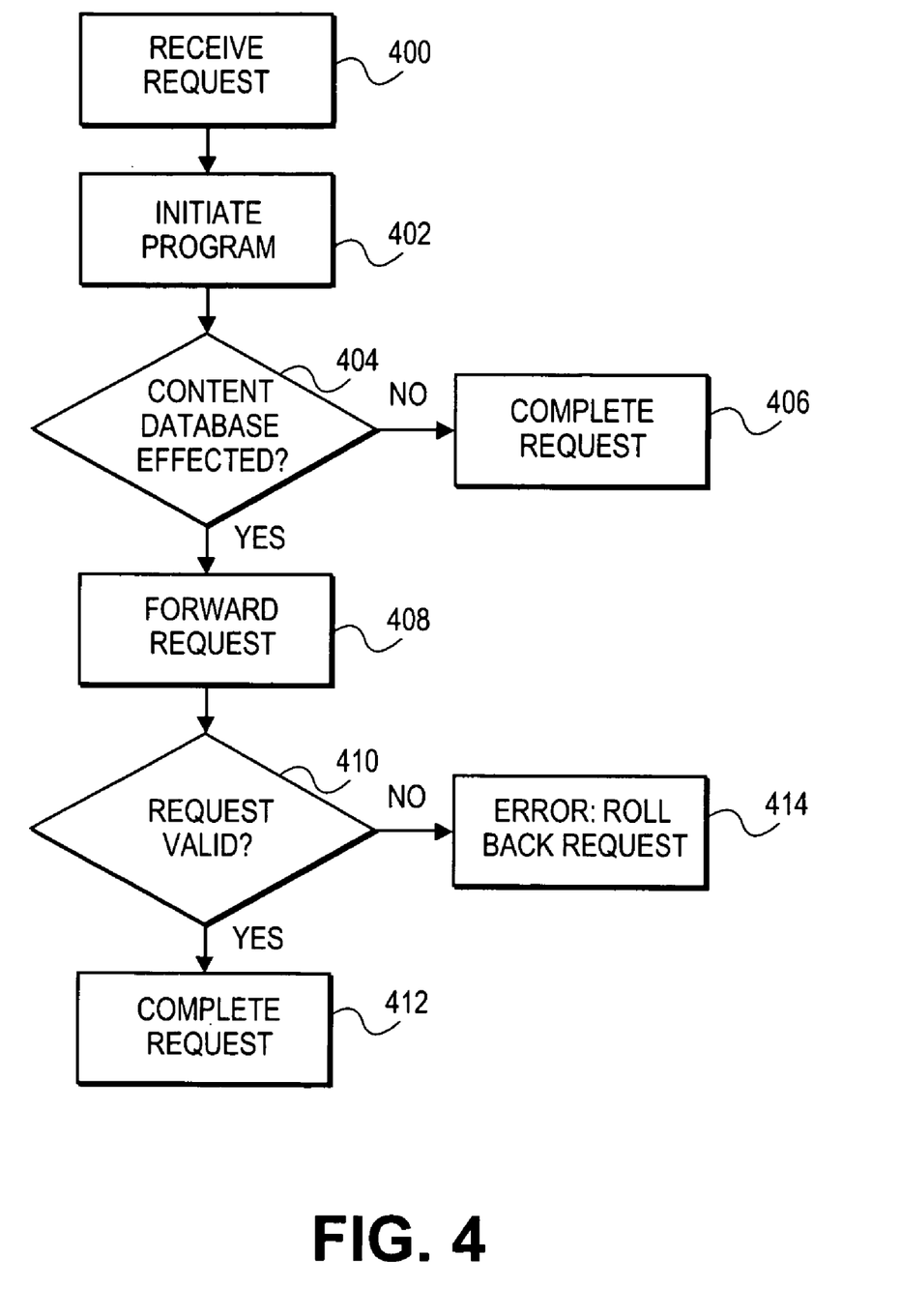
FIG. 4 shows a flow diagram for managing multiple versions of content in accordance with the principles of the present invention.

FIG. 4 shows a flow diagram for dynamically constructing SQL statements in accordance with the principles of the present invention. In stage 400, content management system 100 receives a request from a user. For example, a user may operate client 102 to create, read, update, or delete an item or item type, using a browser application or filling out an online form. Client 102 may then gather this information and forward the request to library server 104.

In stage 402, content management system 100 routes the request to library server 104 and initiates processing of the request. Library server 104 may then parse the request's contents to identify the item affected by the request. For example, library server 104 may run application program 200 to identify the item affected by the request. An item may be identified by its timestamp in timestamp column 210, its version as indicated by information in value columns 212, or a combination of both.

Application program 200 may then use one or more SQL statements to initiate processing for the request. For example, application program 200 may write an entry into transaction table 206. In particular application program 200 may write the item's identifier into column 214, the timestamp for that item into timestamp column 216, and any appropriate attribute information into transaction attribute columns 206 218 such as the item's version information.

Transaction table 206 may be tailored for specific types of requests. For example, transaction table 206 may be used to track items in which a user has requested a delete transaction. As another example, transaction table 206 may be used to track new items created by the user. Any number of transaction tables may be used in library server 104.

In stage 404, application program 200 determines whether the transaction affects only library server database 202 or both library server database 202 and content database 302. For example, if the request includes an update to an item's content or the request deletes an item that includes objects stored in content database 302, then application program 200 may decide that the request affects both the library server database 202 and content database 302. If the request affects information only in library server 202, then processing flows to stage 406. If the request affects information in both library server database and content database 302, then processing flows to stage 408.

In stage 406, the request only affects information in library server database 202. Accordingly, application program 200 operates in conjunction with library server 202 to process the request. Upon completing the request, library server 202 may then notify application program 200. Application program 200 may then notify the user at client 102 that the request has been completed.

In stage 408, the request affects information in both library server database 202 and content database 302. Accordingly, application program 200 and/or library server database 202 may forward information to resource manager 106. For example, library server database 202 may forward information from transaction table 206, such as timestamp information from column 216 and transaction attributes from column 218. Resource manager 106 may then receive this information through communications server 300 and forward it to content database 302.

In stage 410, content database 302 determines whether the request is valid. In particular, content database 302 may analyze the transaction's attributes and identify one or more objects affected by the request. For example, content database 302 may query content index table 306 and retrieve objects that are associated with a particular item's identifier. In addition, content database 302 may retrieve an object's timestamp and version identifier from timestamp column 312 and value columns 314, respectively.

Content database 302 then compares the object's timestamp to the timestamp provided from library server database 202, i.e., from timestamp column 216 of transaction table 206. Content database 302 may also compare an item's version identifier with each object's version identifier. Content database 302 may then decide whether the request is valid based on the timestamps. For example, content database 302 may decide that a request is valid based on checking the timestamps. Alternatively, content database 302 may decide that a request is valid based on checking both the timestamps and version identifiers.

A request may be considered valid under a variety of circumstances. For example, if the timestamp of an item matches the timestamp of the object, then content database 302 may consider the request valid. As another example, if both the timestamps and version identifiers of the item and its objects match, then content database 302 may consider the request valid. As yet another example, if the timestamp of the item is less than the timestamp of the object, then this may indicate that the item has been updated, such as when the user has uploaded a new document. However, if the user has requested that the item be deleted, then content database 302 may still consider this request valid, because the item is now obsolete and a new version of the item has likely been created in library server database 202.

Likewise, a request may be considered invalid under a variety of circumstances. For example, if the timestamp of the item is greater than the timestamp of an object, then this may indicate the object is obsolete. Also, if the timestamps match, but the version identifiers of the items and object do not match, then content database 302 may consider the request invalid.

If the request is considered valid, the processing may flow to stage 412. If the request is considered invalid, then processing may flow to stage 414.

In stage 412, the request is valid, and thus, library database 202 and content database 302 may carry out their respective actions to process the request. For example, for a delete request, content database 302 may remove an object from its storage and update content index table 306. When deleting an object, content database 302 may remove its entry from table 306. Upon completing its actions, content database 302 may then send a message through communications server 300 back to library server database 202. In response, library server database 202 may update transaction table 206 to indicate that the transaction has been completed. Alternatively, library server database 202 may write another entry into transaction table 206 to record when the transaction was completed.

In addition, library server database 202 may update the timestamp recorded in timestamp column 210 of index table 204 to record when an item was last updated. Library server database 202 may also update the version identifier recorded in value columns 212 after a transaction is completed. Upon completing the request, library server database 202 may notify application program 200. Application program 200 may then notify the user at client 102 that the request was completed.

In stage 414, the request is found invalid, and thus, content database 302 may generate one or more messages. For example, content database 302 may generate an error message to recovery module 304. Recovery module 304 may then notify library server database 202 through communications server 300 of the error. Alternatively, content database 302 may notify library server 202 of an error directly.

The invalid request may then be rolled back. In particular, upon receiving notice of an invalid request, library server database 202 may update transaction table 206. For example, library server database 202 may remove the entry for the invalid transaction from transaction table 206. In addition, library server database 202 may roll back any changes made to information in index table 204. Library server database 202 may then notify application program of the invalid request. Subsequently, application program 200 may also notify the user at client 102 that the request was invalid and could not be performed.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of validating a request in connection with a content management system having a library server storing an item and a resource manager storing an object associated with the item, said method comprising:

in response to receiving a request that affects the item, recording the request in a library server transaction table of the library server, the item comprising an identifier that identifies a location of the object in the resource manager which is external to the library server;

identifying a version of the item;

determining whether the request affects the object associated with the item, the object comprising a binary object which is stored in at least one of a file system, a file server, a file archive, or a database separate from the library;

identifying a version of the object in response to determining that the request affects the object, by retrieving a timestamp and an identifier for the object;

determining whether the request is valid based on the version of the item and the version of the object; and in response to determining that the request is not valid, rolling back the request by removing the entry for the request from the library server transaction table;

wherein the item has an item identifier that is associated with the item, and the object has an object identifier that is associated with the object; and wherein the object identifier is different than the item identifier.

2. The method of claim 1, wherein receiving the request comprises receiving a request for deleting the item.

3. The method of claim 1, wherein identifying the version of the item comprises retrieving a timestamp for the item.

4. The method of claim 1, wherein identifying the version of the item comprises retrieving the timestamp and an identifier for the item.

5. The method of claim 1, wherein determining whether the request is valid comprises
   determining whether the version of the item matches the version of the object; and
   completing the request if the versions of the item and object match.

6. The method of claim 1, wherein determining whether the request is valid comprises:
   determining whether the version of the item is older than the version of the object; and
   completing the request if the version of the item is older than the version of the object.

7. The method of claim 1, wherein rolling back the request comprises rolling back any changes made to the item as a result of the request.

8. The method of claim 1, wherein the item is configured to have multiple objects associated with the item.

9. An apparatus for validating a request in connection with a content management system having a library server storing an item and a resource manager storing an object associated with the item, said apparatus comprising:
   means for receiving a request that affects the item, and for recording the request in a library server transaction table of the library server, the item comprising an identifier that identifies a location of the object in the resource manager which is external to the library server;
   means for identifying a version of the item;
   means for determining whether the request affects the object associated with the item, the object comprising a binary object which is stored in at least one of a file system, a file server, a file archive, or a database separate from the library;
   means for identifying a version of the object in response to determining that the request affects the object, by retrieving a timestamp and an identifier for the object;
   means for determining whether the request is valid based on the version of the item and the version of the object; and
   means for, in response to determining that the request is not valid, rolling back the request by removing the entry for the request from the library server transaction table;
   wherein the item has an item identifier that is associated with the item, and the object has an object identifier that is associated with the object; and
   wherein the object identifier is different than the item identifier.

10. An application program for validating a request in connection with content management system having a library server storing an item and a resource manager storing an object associated with the item, said program comprising:
    program code for receiving a request that affects the item, and for recording the request in a library server transaction table of the library server, the item comprising an identifier that identifies a location of the object in the resource manager which is external to the library server;
    program code for identifying a version of the item;
    program code for determining whether the request affects the object associated with the item, the object comprising a binary object which is stored in at least one of a file system, a file server, a file archive, or a database separate from the library;
    program code for identifying a version of the object in response to determining that the request affects the object, by retrieving a timestamp and an identifier for the object;
    program code for determining whether the request is valid based on the version of the item and the version of the object; and
    program code for, in response to determining that the request is not valid, rolling back the request by removing the entry for the request from the library server transaction table;
    wherein the item has an item identifier that is associated with the item, and the object has an object identifier that is associated with the object; and
    wherein the object identifier is different than the item identifier.

11. The medium of claim 10, further comprising program code for receiving a request for deleting the item.

12. The medium of claim 10, further comprising program code for retrieving a timestamp for the item.

13. The medium of claim 10, further comprising program code for retrieving the timestamp and an identifier for the item.

14. The medium of claim 10, further comprising program code for retrieving a timestamp for the object.

15. The medium of claim 14, further comprising program code for retrieving the timestamp and an identifier for the object.

16. The medium of claim 10, further comprising:
    program code for determining whether the version of the item matches the version of the object; and
    program code for completing the request if the versions of the item and object match.

17. The medium of claim 10, further comprising:
    program code for determining whether the version of the item is older than the version of the object; and
    program code for completing the request if the version of the item is older than the version of the object.

18. A method of processing requests that delete an item in connection with a content management system having a library server storing an item and a resource manager storing an object associated with the item, said method comprising:
    in response to receiving a request that deletes the item, recording the request in a library server transaction table of the library server, the item comprising an identifier that identifies a location of the object in the resource manager which is external to the library server;

identifying a first age of the item affected by the request;

determining whether the request affects the object associated with the item, the object comprising a binary object which is stored in at least one of a file system, a file server, a file archive, or a database separate from the library identifying a second age of the object in response to determining that the request affects the object;

determining whether the request is valid based on the first age and the second age;

selectively deleting the item and the object based on whether the first age of the item is greater than or equal to the second age of the object; and in response to determining that the request is not valid, rolling back the request by removing the entry for the request from the library server transaction table;

wherein the item has an item identifier that is associated with the item, and the object has an object identifier that is associated with the object; and wherein the object identifier is different than the item identifier.

19. An apparatus for processing requests that delete an item in connection with a content management system having a library server storing the item and a resource manager storing an object associated with the item, said apparatus comprising:

means for receiving a request that deletes the item, and for recording the request in a library server transaction table of the library server, the item comprising an identifier that identifies a location of the object in the resource manager which is external to the library server;

means for identifying a first age of the item affected by the request;

means for determining whether the request affects the object associated with the item, the object comprising a binary object which is stored in at least one of a file system, a file server, a file archive, or a database separate from the library;

means for retrieving information indicating a second age of the object in response to determining that the request affects the object;

determining whether the request is valid based on the first age and the second age;

means for selectively deleting the item and the object based on whether the first age of the item is greater than or equal to the second age of the object; and means for, in response to determining that the request is not valid, rolling back the request by removing the entry for the request from the library server transaction table;

wherein the item has an item identifier that is associated with the item, and the object has an object identifier that is associated with the object; and wherein the object identifier is different than the item identifier.

* * * * *